(12) United States Patent
Chang et al.

(10) Patent No.: US 11,408,822 B2
(45) Date of Patent: Aug. 9, 2022

(54) METHOD OF GENERATING TERAHERTZ WAVE AND APPARATUSES PERFORMING THE SAME

(71) Applicant: Electronics and Telecommunications Research Institute, Daejeon (KR)

(72) Inventors: Sun Hyok Chang, Daejeon (KR); Sang Rok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/131,063

(22) Filed: Dec. 22, 2020

(65) Prior Publication Data
US 2021/0270732 A1     Sep. 2, 2021

(30) Foreign Application Priority Data
Feb. 28, 2020   (KR) .................. 10-2020-0025453

(51) Int. Cl.
*G01N 21/3586*   (2014.01)
*G01N 21/39*     (2006.01)
*G02F 1/39*      (2006.01)

(52) U.S. Cl.
CPC ......... *G01N 21/3586* (2013.01); *G01N 21/39* (2013.01); *G02F 1/39* (2013.01); *G02F 2203/56* (2013.01)

(58) Field of Classification Search
CPC ...... G01N 21/3586; G01N 21/39; G02F 1/39; G02F 2203/56
See application file for complete search history.

(56) References Cited

U.S. PATENT DOCUMENTS

| 10,230,216 B1 | 3/2019 | Nguyen et al. |
| 10,270,390 B2 | 4/2019 | Suzuki et al. |
| 10,523,333 B2 | 12/2019 | Lee et al. |
| 2019/0165867 A1 | 5/2019 | Chang et al. |

FOREIGN PATENT DOCUMENTS

| FR | 3061367 B1 * | 6/2019 | ........... G02F 1/3534 |
| GB | 2415309 A * | 12/2005 | ......... H04B 10/2575 |
| JP | 2011-80860 | 4/2011 | |
| JP | 2017-208541 | 11/2017 | |
| KR | 10-1672971 | 11/2016 | |
| KR | 10-1986993 | 9/2019 | |

* cited by examiner

*Primary Examiner* — David P Porta
*Assistant Examiner* — Fani Polyzos Boosalis
(74) *Attorney, Agent, or Firm* — Kile Park Reed & Houtteman PLLC (57) ABSTRACT

A method of generating a terahertz wave and apparatuses performing the method are disclosed. According to an example embodiment, a method of generating a terahertz wave includes outputting a laser comb by modulating a laser output from a laser source based on a linearly modulated frequency of an output that is output from a frequency source, and generating a terahertz wave based on a first comb line and a second comb line selected from the laser comb.

17 Claims, 9 Drawing Sheets

Variable frequency

Laser comb

FIG. 4

Select frequency

Variable frequency

FIG. 7A

Select frequency

FIG. 7B

Select frequency

FIG. 7C

Select frequency

FIG. 7D

Select frequency

FIG. 8

| N | N*f$_m$range(GHz) |
|---|---|
| 10 | 250~275 |
| 11 | 275~302.5 |
| 12 | 300~330 |
| ... | ... |
| 20 | 500~550 |

METHOD OF GENERATING TERAHERTZ WAVE AND APPARATUSES PERFORMING THE SAME

CROSS-REFERENCE TO RELATED APPLICATION(S)

This application claims the benefit of Korean Patent Application No. 10-2020-0025453, filed on Feb. 28, 2020, in the Korean Intellectual Property Office, the disclosure of which is incorporated herein by reference.

BACKGROUND

1. Field of the Invention

Example embodiments relate to a method of generating a terahertz wave and apparatuses performing the method.

2. Description of the Related Art

In recent years, as a frequency of a radio frequency (RF) band for wireless communication is gradually exhausted, research on terahertz (THz) wireless communication using a light source of a terahertz band is attracting much attention. In addition, many recent research results applied to technologies such as terahertz imaging, terahertz spectroscopy, and synthetic aperture radar (SAR) using a terahertz band light source have been published.

The terahertz band corresponds to an electromagnetic wave in a frequency range from 0.3 THz to 10 THz and may be a terahertz optical source.

The terahertz wave (THz-wave) which corresponds to the terahertz light source may be capable of interacting with various materials such as paper and plastic. For example, numerous types of various materials may interact with the terahertz wave in the aforementioned frequency domain. Data obtained through the interaction may be used to perform a test, imaging, and an analysis of a sample material so that information on properties and/or morphology of the material is obtained. The information on properties and/or morphology of the material may be obtained from the data obtained through the interaction.

Terahertz technology may be used in various fields such as wireless communication, biomedical, gas sensing, and spectroscopy. Recently, for example, with developments of femtosecond lasers and semiconductor lasers that generate terahertz frequencies, researches using terahertz frequencies are being actively conducted. In time-domain spectroscopy, a spectrometer technique using the femtosecond laser may be available. In frequency-domain spectroscopy, a continuously frequency-tunable terahertz light source may be required.

SUMMARY

An aspect provides technology for generating a frequency sweep terahertz wave that may sweep a wide frequency band at a high speed by modulating a laser output from a laser source based on a frequency obtained by modulating an out frequency output from a frequency source.

According to an aspect, there is provided a method of generating a terahertz wave, the method including outputting a laser comb by modulating a laser output from a laser source based on a linearly modulated frequency of an output that is output from a frequency source, and generating a terahertz wave based on a first comb line and a second comb line selected from the laser comb.

The generating may include selecting the first comb line and the second comb line from the laser comb using an optical filter such that a difference in frequency corresponds to a terahertz frequency range, and generating the terahertz wave based on a difference in frequency between the first comb line and the second comb line.

The laser source may be at least one of a uni-traveling carrier-photodiode (UTC-PD), a Schottky barrier diode (SBD), and a fermi-level managed barrier diode (FMBD).

The optical filter may be a filter in which a function of at least one of a bandpass-type optical filter, a wavelength selective switch, an arrayed waveguide grating, and an optical filter array is implemented.

The method may further include modulating a frequency of the output.

The modulating may include linearly modulating the frequency of the output from a first value to a second value with time.

The linearly modulating may include modulating the frequency of the output such that the frequency is linearly repeated from the first value to the second value.

The outputting may include generating the laser comb for each modulation time point at which the frequency of the output is modulated.

The generating may include selecting the first comb line and the second comb line from the laser comb for each modulation time point such that a difference in frequency between the first comb line and the second comb line linearly increases based on a frequency modulated at each modulation time point, and generating the terahertz wave of which a frequency increases at each modulation time point based on the difference in frequency between the first comb line and the second comb line.

The selecting may include selecting the first comb line and the second comb line from the laser comb in response to a synchronization signal output for each modulation time point.

According to another aspect, there is also provided a terahertz wave generation apparatus including a laser comb generator configured to generate a laser comb by modulating a laser output from a laser source based on a linearly modulated frequency of an output that is output from a frequency source, a frequency selector configured to select a first comb line and a second comb line from the laser comb, and a terahertz wave generator configured to generate a terahertz wave based on the first comb line and the second comb line.

The terahertz wave generation apparatus may further include a frequency modulator configured to modulate a frequency of the output such that the frequency is linearly repeated from a first value to a second value with time.

The frequency modulator may be configured to generate a synchronization signal and output the generated synchronization signal such that the frequency selector operates at each modulation time point at which the frequency of the output is modulated.

The laser comb generator may be configured to generate the laser comb at each modulation time point.

The frequency selector may be configured to select the first comb line and the second comb line from the laser comb for each modulation time point such that a difference in frequency between the first comb line and the second comb line linearly increases based on a frequency modulated at each modulation time point.

The frequency selector may be configured to select the first comb line and the second comb line from the laser comb in response to a synchronization signal output at each modulation time point.

The terahertz wave generator may be configured to generate the terahertz wave of which a frequency increases at each modulation time point.

According to another aspect, there is also provided a terahertz wave generation system including a laser source, a frequency source, and a terahertz wave generation apparatus, wherein the terahertz wave generation apparatus modulates a frequency of an output that is output from the frequency source such that the frequency is linearly repeated from a first value to a second value, generates a laser comb by modulating a laser output from the laser source at each modulation time point at which the frequency of the output is modulated based on the modulated frequency, selects a first comb line and a second comb line from the laser comb, and generates a terahertz wave based on the first comb line and the second comb line.

According to another aspect, there is also provided a terahertz wave generation system including a laser source, a frequency source, a frequency modulator configured to modulate a frequency of an output that is output from the frequency source, and a terahertz wave generation apparatus, wherein the terahertz wave generation apparatus generates a laser comb by modulating a laser output from the laser source at each modulation time point at which the frequency of the output is modulated based on the modulated frequency, selects a first comb line and a second comb line from the laser comb, and generates a terahertz wave based on the first comb line and the second comb line.

The frequency modulator may be configured to modulate the frequency of the output such that the frequency is linearly repeated from a first value to a second value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Reference will now be made in detail to example embodiments, examples of which are illustrated in the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In the present disclosure, the term "module" may refer to hardware that performs a function and an operation for each name explained in the specification, a computer program code that performs predetermined function and operation, or an electronic recordable medium, for example, a processor and a microprocessor, including a computer program code for performing predetermined function and operation.

Accordingly, the module may indicate a functional and/or structural combination of hardware for performing technical ideas of the present disclosure and/or software for driving the hardware.

Hereinafter, example embodiments will be described in detail with reference to the accompanying drawings. It should be understood, however, that there is no intent to limit this disclosure to the particular example embodiments disclosed. Like numbers refer to like elements throughout the description of the figures.

Figure 1:
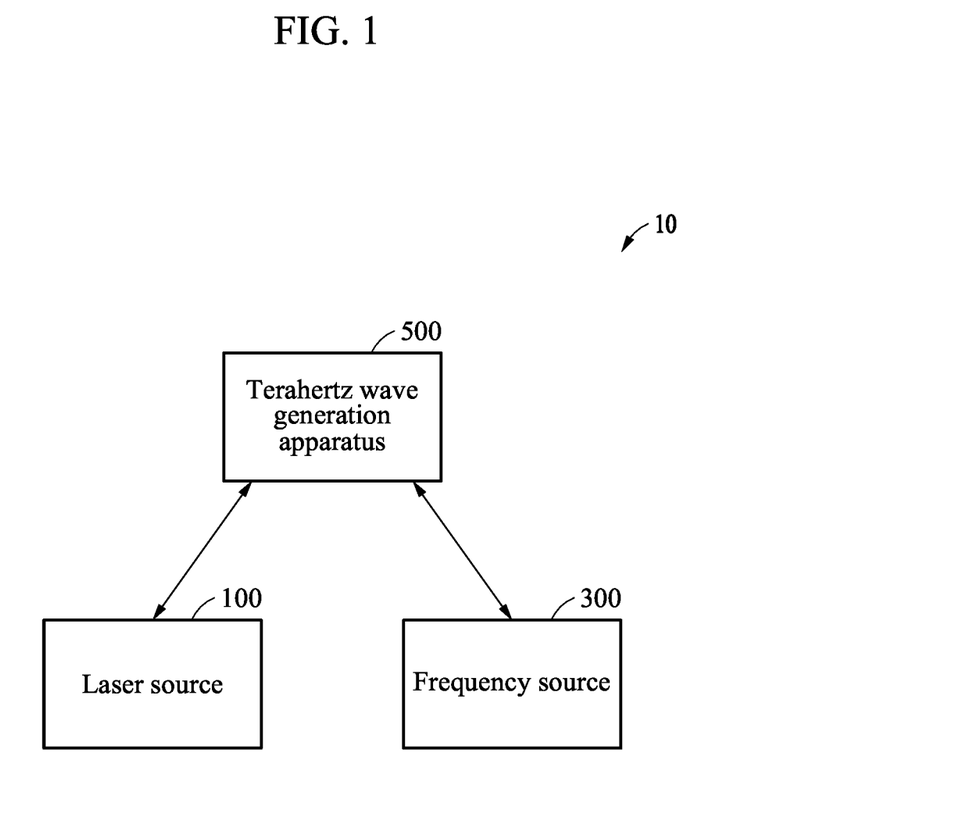
FIG. 1 is a block diagram illustrating a terahertz wave generation system according to an example embodiment.

FIG. 1 is a block diagram illustrating a terahertz wave generation system according to an example embodiment.

A terahertz wave generation system 10 includes a laser source 100, a frequency source 300, and a terahertz wave generation apparatus 500.

The laser source 100 is a light source such as a semiconductive laser having a frequency and may output a laser. For example, the laser source 100 may be various light-emitting elements such as a uni-traveling carrier-photodiode (UTC-PD), a Schottky barrier diode (SBD), a fermi-level managed barrier diode (FMBD), and the like.

The frequency source 300 may output various frequencies in a radio frequency (RF) band. In this instance, an output of the frequency source 300 may be a radio frequency.

The terahertz wave generation apparatus 500 may modulate a frequency of an output (out) output from the frequency source 300 and modulate a laser output from the laser source 100 based on the modulated frequency, thereby generating a frequency sweeping terahertz wave that sweeps a wide frequency band at a high speed.

Through this, the terahertz wave generation apparatus 500 may generate a terahertz wave for frequency sweeping that enables continuous wide-band terahertz frequency sweeping and has a high frequency sweeping speed and high output power. Accordingly, the terahertz wave for frequency sweeping may be more useful in various fields than a typical terahertz wave.

As illustrated in FIG. 1, the frequency source 300 may be implemented independently of the terahertz wave generation apparatus 500, but is not limited thereto. For example, the frequency source 300 may be implemented inside the terahertz wave generation apparatus 500.

Figure 2:
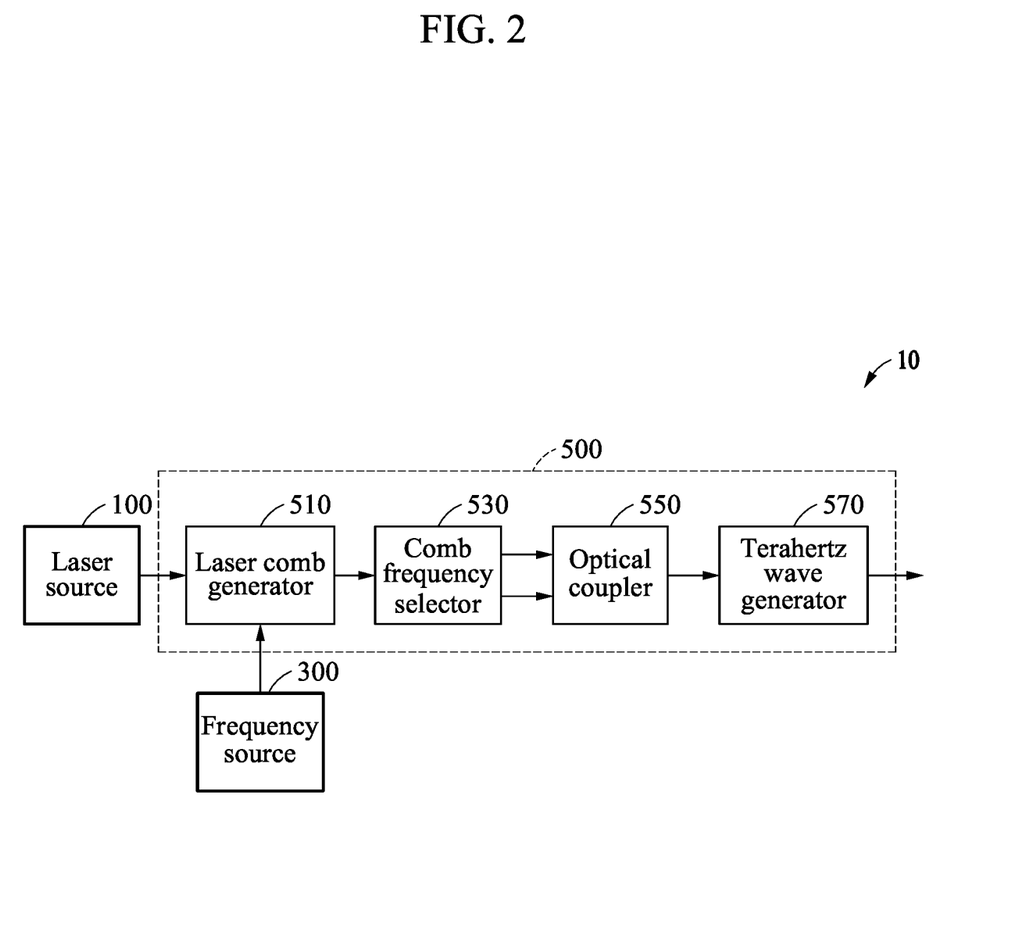
FIG. 2 illustrates an example of a terahertz wave generation apparatus of FIG. 1.
Figure 3:
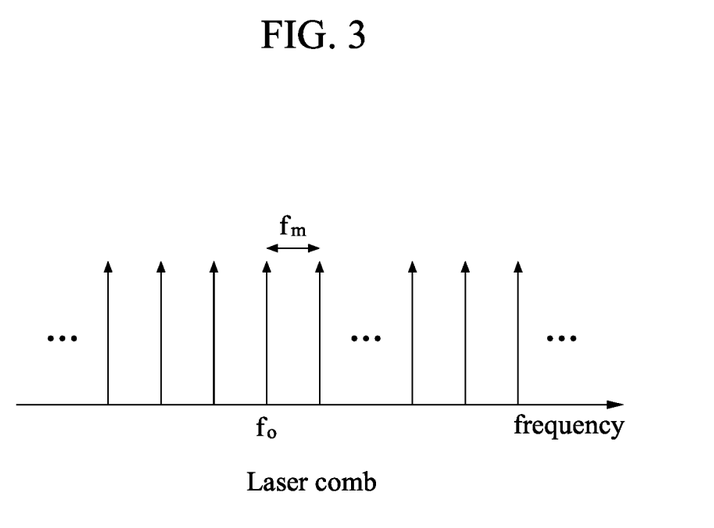
FIG. 3 illustrates an example of a frequency domain of a laser comb.
Figure 4:
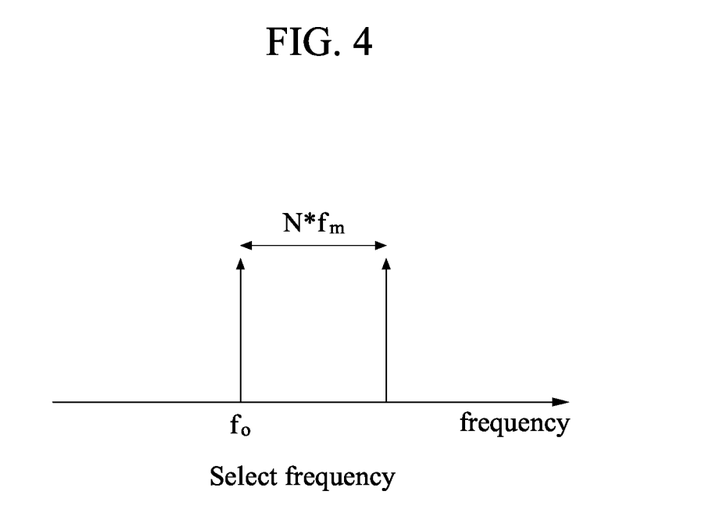
FIG. 4 illustrates an example of frequency domains of a first comb line and a second comb line.

FIG. 2 illustrates an example of the terahertz wave generation apparatus of FIG. 1, FIG. 3 illustrates an example of a frequency domain of a laser comb, and FIG. 4 illustrates an example of frequency domains of a first comb line and a second comb line.

Referring to FIGS. 2 through 4, the terahertz wave generation apparatus 500 may include a laser comb generator 510, a comb frequency selector 530, an optical coupler 550, and a terahertz wave generator 570.

A laser output from the laser source 100 and an output that is output from the frequency source 300 may be input to the laser comb generator 510. At this time, a frequency of the laser may be f0 as illustrated in FIG. 3. The output that is output from the frequency source 300 may be fm as illustrated in FIG. 3.

The laser comb generator 510 may generate a laser comb by modulating the laser based on the frequency of the output from the frequency source. For example, the laser comb generator 510 may generate a laser comb including a plurality of comb lines (or a plurality of laser comb lines) separated at intervals of fm which is the frequency of the output of the frequency source 300 based on f0 which is the frequency of the laser. A frequency domain of the laser comb may be as shown in FIG. 3.

The laser comb generator 510 may output the generated laser comb to the comb frequency selector 530.

The comb frequency selector 530 that selects a laser frequency may select two frequencies from the plurality of comb lines included in the laser comb. For example, the comb frequency selector 530 may select a first comb line and a second comb line from the laser comb using an optical filter such that a difference in frequency corresponds to a terahertz frequency range. In this example, the first comb line and the second comb line may be spaced apart by a frequency interval of the terahertz frequency. The optical filter may be a filter in which various functions, for example, a function of at least one of a bandpass-type optical filter, a wavelength selective switch, an arrayed waveguide grating, and an optical filter array.

The comb frequency selector 530 may output the two selected comb lines, that is, the first comb line and the second comb line to the optical coupler 550. Frequency domains of the first comb line and the second comb line corresponding to the output of the comb frequency selector 530 may be formed as shown in FIG. 4. Comb frequencies of the first comb line and the second comb line may be frequencies spaced apart by N*fm. The comb frequency selector 530 may select a comb line by setting a value of N and/or fm such that a frequency of a terahertz band is obtained from N*fm.

The optical coupler 550 may couple the first comb line and the second comb line, each output from the comb frequency selector 530. The optical coupler 550 may output a combination of the first comb line and the second comb line to a terahertz wave generator or allow the combination to be incident to the terahertz wave generator.

The terahertz wave generator 570 may generate a terahertz wave based on a difference in frequency between the first comb line and the second comb line. For example, the terahertz wave generator 570 may generate and output a terahertz wave corresponding to N*fm which is the difference in frequency between the first comb line and the second comb line being input. At this time, the terahertz wave generator 570 may use an element that generates and outputs a terahertz wave by converting the difference in frequency between two comb lines into the terahertz wave. Output power of the terahertz wave generator 570 may be proportional to an optical power of a comb line being input. The optical power may be increased to be sufficiently large using an optical amplifier. Thus, the output power of the terahertz wave may become high easily. Accordingly, the terahertz wave may have high output power so as to sweep a wide frequency band at a high speed.

Figure 5:
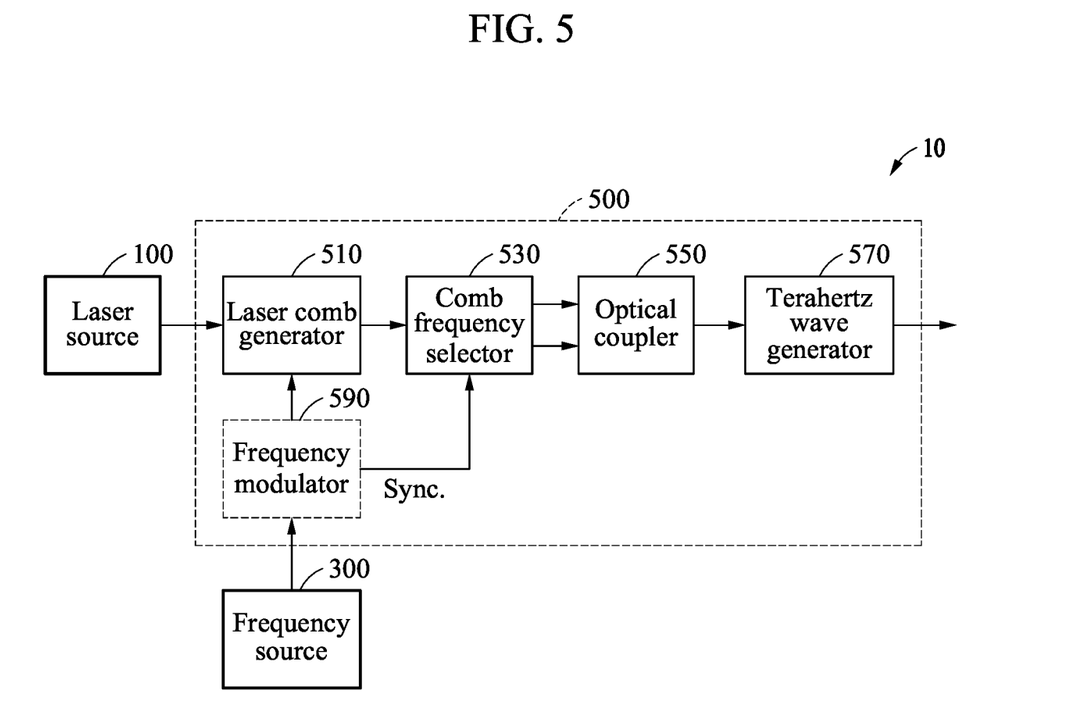
FIG. 5 illustrates another example of a terahertz wave generation apparatus of FIG. 1.
Figure 6:
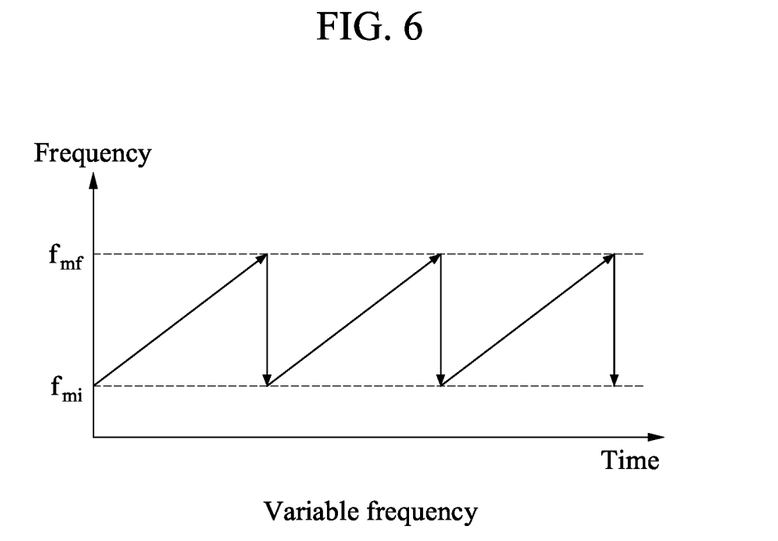
FIG. 6 illustrates an example of modulating a frequency with time.

FIG. 5 illustrates another example of the terahertz wave generation apparatus of FIG. 1 and FIG. 6 illustrates an example of modulating a frequency with time.

Referring to FIGS. 5 and 6, the terahertz wave generation apparatus 500 may further include a frequency modulator 590 in addition to the laser comb generator 510, the comb frequency selector 530, the optical coupler 550, and the terahertz wave generator 570 such that a terahertz wave is swept in a wide frequency band at a high speed. The frequency modulator 590 may be implemented inside the terahertz wave generation apparatus 500, and it is merely an example. For example, the frequency modulator 590 may be implemented independently of the terahertz wave generation apparatus 500 to be distinguished therefrom.

The frequency modulator 590 may modulate a frequency of an output of the frequency source 300. For example, the frequency modulator 590 may modulate a frequency of the output of the frequency source 300 such that the frequency is linearly repeated from a first value to a second value with time, and then output the modulated frequency to the laser comb generator 510.

As illustrated in FIG. 6, the frequency of the output of the frequency source 300 may be modulated to be linearly repeated from an initial value fmi to a final value fmf with time. Here, the initial value fmi is the first value and the final value fmf is the second value.

The frequency modulator 590 may generate a synchronization signal and output the generated synchronization signal to the comb frequency selector 530 so that the comb frequency selector 530 operates at each modulation time point at which the frequency of the output of the frequency source 300 is modulated. Hence, the modulation of the output frequency of the frequency source 300 may be performed in conjunction with a process of selecting a comb frequency.

The laser comb generator 510 may generate a laser comb each modulation time point at which the frequency of the output of the frequency source 300. For example, the laser comb generator 510 may generate a laser comb each modulation time point by modulating a laser output from the laser source 100 based on a frequency (or modulated frequency) output from the frequency modulator 590. When the frequency modulator 590 modulates fm which is the frequency of the output of the frequency source 300 into fmi, the laser comb generator 510 may generate a laser comb including a plurality of comb lines spaced apart at intervals of fmi based on a frequency of the laser, f0.

The comb frequency selector 530 may select a first comb line and a second comb line from the laser comb generated each modulation time point using an optical filter. For example, the comb frequency selector 530 may select the first comb line and the second comb line such that a difference in frequency between the first comb line and the second comb line linearly increases based on the frequency modulated at each modulation time point. In this example, the comb frequency selector 530 may select the first comb line and the second comb line from the laser comb generated each modulation time point in response to a synchronization signal output at each modulation time point.

When the output frequency of the frequency source 300 is modulated to be repeated from fmi to fmf with time, the comb frequency selector 530 may select two comb lines spaced apart at frequency intervals corresponding to a terahertz frequency interval from a laser comb generated at each point in time.

Since the description of FIGS. 2 through 4 may apply to an operation of the optical coupler 550, a detailed description will be omitted.

The terahertz wave generator 570 may generate a terahertz wave of which a frequency increases for each modulation time point of the output frequency based on the difference in frequency between the first comb line and the second comb line.

Figure 7A:
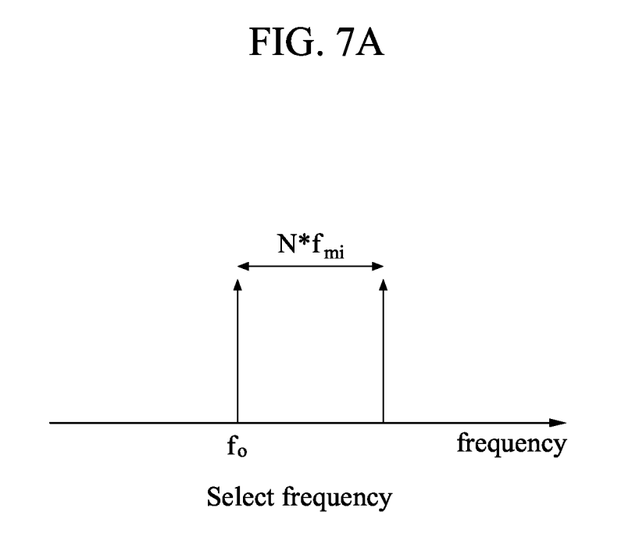
FIG. 7A illustrates an example of frequency domains of a first comb line and a second comb line in accordance with frequency modulation.
Figure 7B:
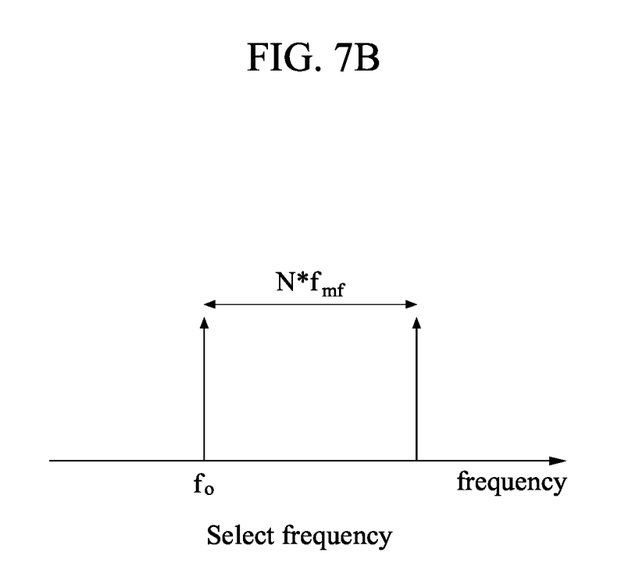
FIG. 7B illustrates another example of frequency domains of a first comb line and a second comb line in accordance with frequency modulation.
Figure 7C:
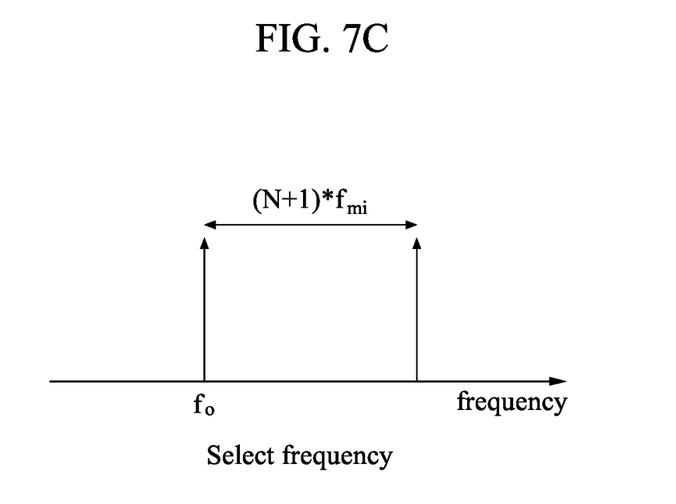
FIG. 7C illustrates another example of frequency domains of a first comb line and a second comb line in accordance with frequency modulation.
Figure 7D:
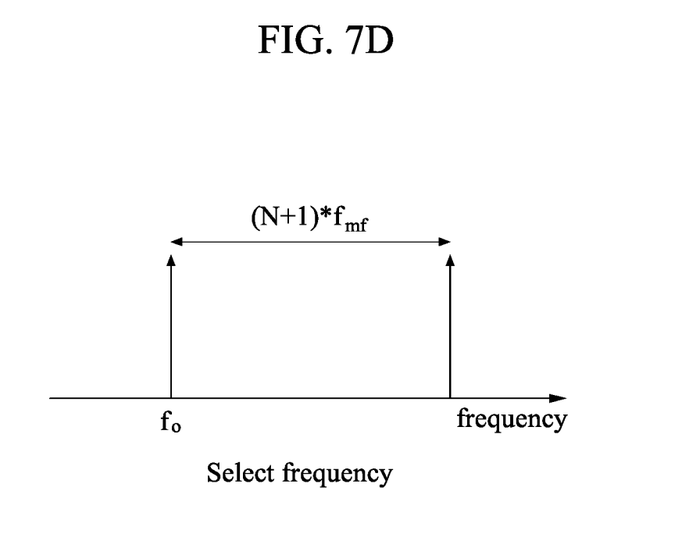
FIG. 7D illustrates another example of frequency domains of a first comb line and a second comb line in accordance with frequency modulation.
Figure 8:
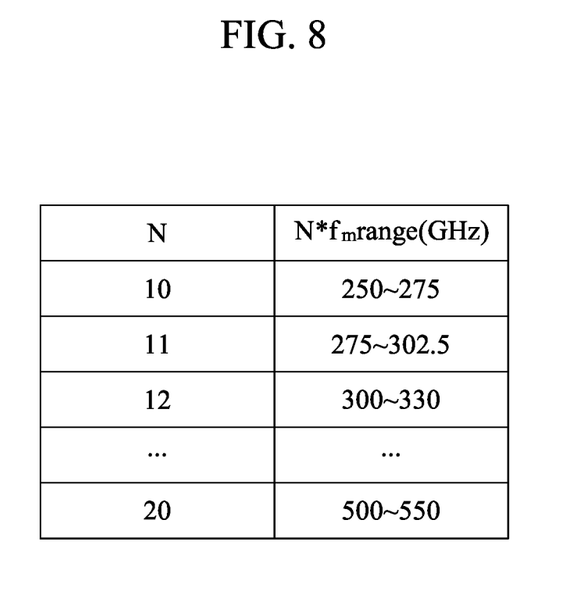
FIG. 8 illustrates a difference in frequency between comb lines based on a number of times that frequency modulation is repeated.

FIG. 7A illustrates an example of frequency domains of a first comb line and a second comb line in accordance with frequency modulation, FIG. 7B illustrates another example of frequency domains of a first comb line and a second comb line in accordance with frequency modulation, FIG. 7C illustrates another example of frequency domains of a first comb line and a second comb line in accordance with frequency modulation, FIG. 7D illustrates another example of frequency domains of a first comb line and a second comb line in accordance with frequency modulation, and FIG. 8 illustrates a difference in frequency between comb lines based on a number of times that frequency modulation is repeated.

Referring to FIGS. 7A through 7D, when an output frequency of the frequency source 300 is modulated into fmi, the comb frequency selector 530 may select two comb lines having a difference in frequency of N*fmi corresponding to a terahertz frequency interval from a laser comb generated based on fmi as shown in FIG. 7A. When the output frequency of the frequency source 300 is modulated into fmf, the comb frequency selector 530 may select two comb lines having a difference in frequency of N*fmf corresponding to a terahertz frequency interval from a laser comb generated based on fmf as shown in FIG. 7B.

When the output frequency of the frequency source 300 is repeated once and then modulated into fmi again, the comb frequency selector 530 may select two comb lines having a difference in frequency of (N+1)*fmi corresponding to a terahertz frequency interval from a laser comb generated based on fmi as shown in FIG. 7C. In this case, the two selected comb lines may be the same (or in the same position) as the two comb lines selected in the example of FIG. 7B. When the output frequency of the frequency source 300 is modulated into fmf again, the comb frequency selector 530 may select two comb lines having a difference in frequency of (N+1)*fmf corresponding to a terahertz frequency interval from a laser comb generated based on fmf as shown in FIG. 7D.

As described above, frequencies of the two selected comb lines may move continuously to high frequencies in accordance with the modulation of the output frequency. The difference in frequency between the two comb lines may consecutively increase.

If an initial value (e.g., fmi) is 25 gigahertz (GHz) and a final value (e.g., fmf) is 27.5 GHz, the difference in frequency between the two selected comb lines may consecutively increase according to repetitive frequency modulations as shown in FIG. 8. As illustrated in FIG. 8, a frequency of the terahertz wave output while changing in a range from N=10 to N=20 may correspond to 250 to 550 GHz. As such, the terahertz wave may be generated to enable frequency sweeping of a frequency band of about 300 GHz. In this case, the comb frequency selector 530 may continuously move in the frequency band of about 300 GHz.

As the foregoing, if the initial value (e.g., fmi) is 25 gigahertz (GHz) and the final value (e.g., fmf) is 27.5 GHz, the difference in frequency between the comb lines may continuously increase and the terahertz wave may enable the frequency sweeping based on the difference in frequency. However, embodiments are not limited thereto. For example, the same manner may be applied to another frequency modulation band and frequency change so that the terahertz wave is generated to enable the frequency sweeping.

As described above, since the frequencies of the two comb lines are sweeping continuously, for the terahertz wave based on the difference in frequency between the two comb lines, frequencies of a significantly wide band may be continuously swept at a high speed in accordance with the modulation of the output frequency of the frequency source 300. In other words, the terahertz wave may be a terahertz wave that enables high-speed frequency sweeping based on a selecting operation of the comb frequency selector 530 and output frequency modulation band and modulation speed of the frequency source 300.

The output frequency modulation of the frequency source 300 may be performed at a relatively high speed. The comb frequency selector 530 may sweep at the same speed as the frequency modulation speed. Accordingly, the terahertz wave may ensure a wide-band terahertz frequency sweeping.

Figure 9:
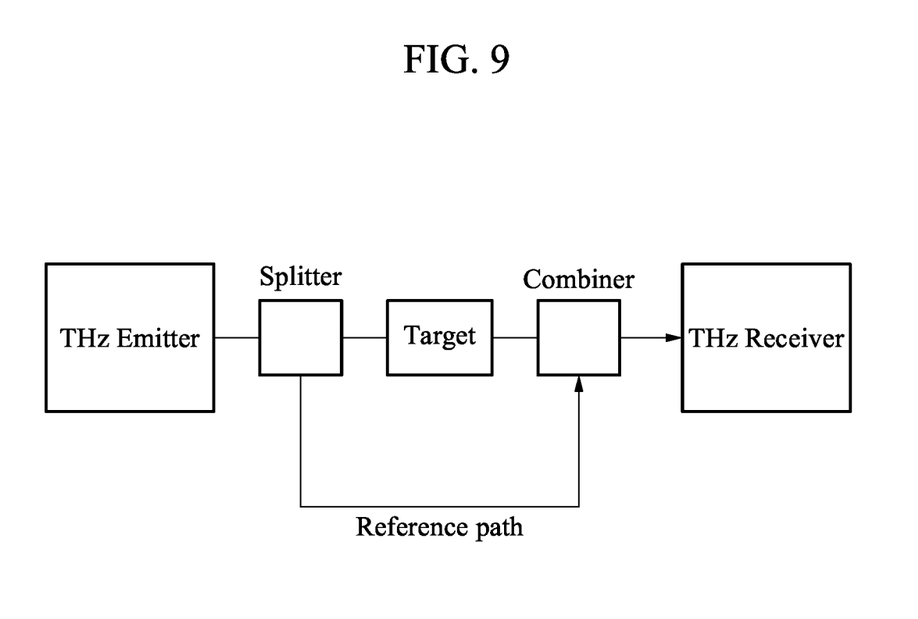
FIG. 9 illustrates an example of a method of measuring a property of a substance using a terahertz wave.
Figure 10:
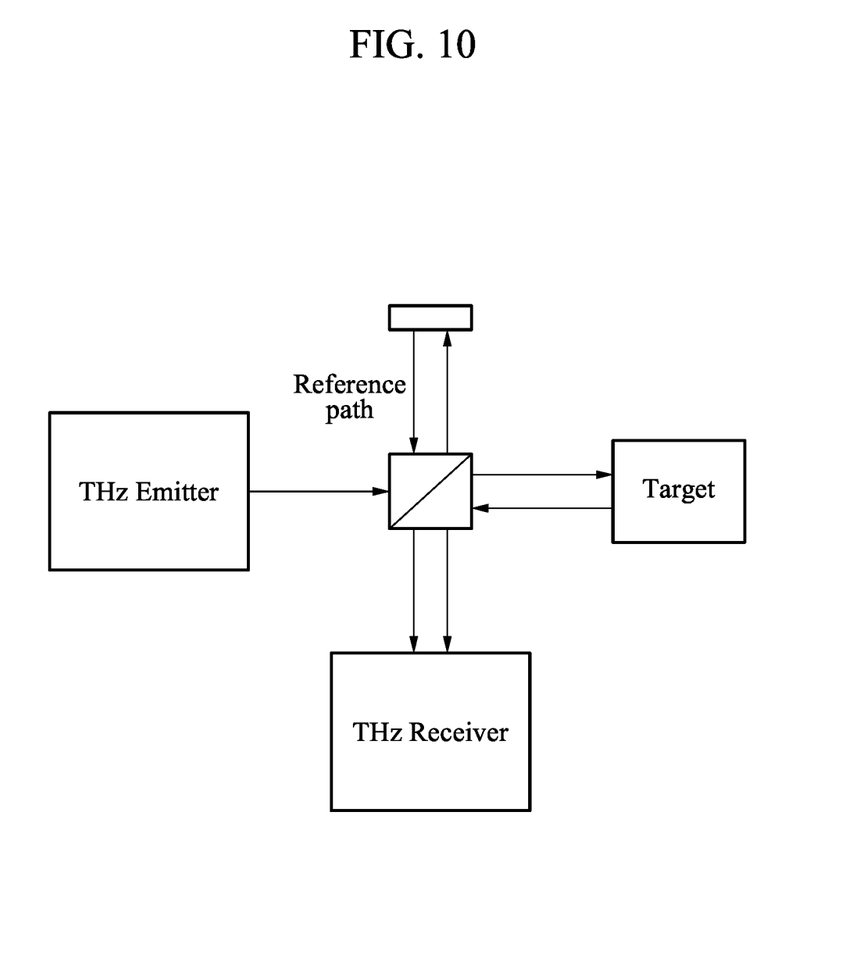
FIG. 10 illustrates another example of a method of measuring a property of a substance using a terahertz wave.

FIG. 9 illustrates an example of a method of measuring a property of a substance using a terahertz wave and FIG. 10 illustrates another example of a method of measuring a property of a substance using a terahertz wave.

An apparatus for measuring a property of a material using the terahertz wave may be as shown in FIGS. 9 and 10. A terahertz wave generator of FIGS. 9 and 10 may be requested to generate a terahertz wave of a wide frequency band. In addition, the apparatus for measuring the property of the material may have an accuracy of analysis increasing as output power of the terahertz generator increases. Accordingly, the terahertz wave generation apparatus 500 described with reference to FIGS. 1 through 8 may apply to the terahertz generator of FIGS. 9 and 10 to generate the terahertz wave of the wide frequency band and increase the accuracy of analysis.

Referring to FIG. 9, the terahertz wave generated in the terahertz generator (e.g., THz emitter) may be divided into two paths. One of the two paths of the terahertz wave may be used as a reference path. A remaining one of the two paths of the terahertz wave may pass a target, and then meet the terahertz wave having passed the reference path and interfere therewith. A signal received in a THz receiver may be analyzed to reconstruct an image and a frequency domain characteristic of the target.

Referring to FIG. 10, unlike FIG. 9, an apparatus for measuring a property of a material may use a terahertz wave (THz-wave) reflected from a target. A terahertz wave generated in a terahertz generator (e.g., THz emitter) may meet through two paths, for example, a reference path and a target-directional path, and then interfere with each other. A signal received in a THz receiver may be analyzed to reconstruct an image and a frequency domain characteristic of the target.

Figure 11:
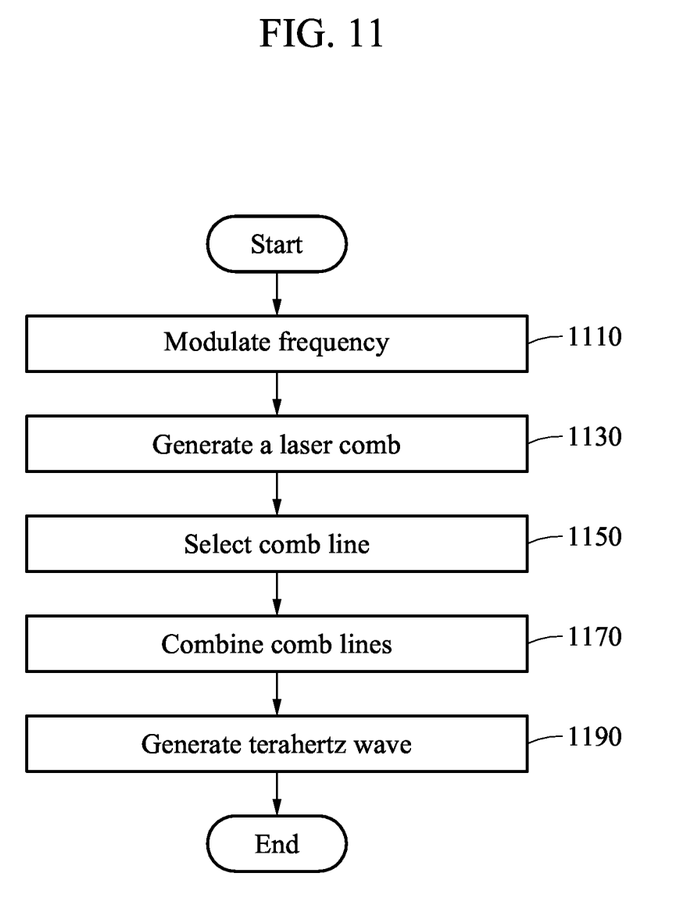
FIG. 11 is a flowchart illustrating an operation of a light generation apparatus of FIG. 2.

FIG. 11 is a flowchart illustrating an operation of the light generation apparatus of FIG. 2.

In operation 1110, the frequency modulator 590 may linearly repetitively modulate a frequency of an output that is output from the frequency source 300 from a first value to a second value with time, and then output a frequency modulated each frequency modulation time point to the laser comb generator 510.

In operation 1130, the laser comb generator 510 may generate a laser comb each modulation time point by modulating a frequency of a laser output from the laser source based on a frequency output from the frequency modulator 590.

In operation 1150, the comb frequency selector 530 may select a first comb line and a second comb line from the laser comb for each modulation time point in response to a synchronization signal transmitted from the frequency modulator 590 such that a difference in frequency between the first comb line and the second comb line spaced apart by a terahertz frequency interval continuously linearly increases based on the frequency modulated at each modulation time point, and then output the first comb line and the second comb line to the optical coupler 550.

In operation 1170, the optical coupler 550 may combine the first comb line and the second comb line and output the coupled comb lines to the terahertz wave generator 570.

In operation 1190, the terahertz wave generator 570 may generate a terahertz wave of which a frequency increases at each modulation time point based on a difference in frequency between the first comb line and the second comb line.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of generating a terahertz wave, the method comprising:
   outputting a laser comb by modulating a laser output from a laser source based on a linearly modulated frequency of an output that is output from a frequency source; and
   generating a terahertz wave based on a first comb line and a second comb line selected from the laser comb,
   wherein the generating comprises:
   generating the terahertz wave based on a difference in frequency between the first comb line and the second comb line.

2. The method of claim 1, wherein the generating comprises:
   selecting the first comb line and the second comb line from the laser comb using an optical filter such that a difference in frequency corresponds to a terahertz frequency range.

3. The method of claim 2, wherein the optical filter is a filter in which a function of at least one of a bandpass-type optical filter, a wavelength selective switch, an arrayed waveguide grating, and an optical filter array is implemented.

4. The method of claim 1, wherein the laser source is at least one of a uni-traveling carrier-photodiode (UTC-PD), a Schottky barrier diode (SBD), and a fermi-level managed barrier diode (FMBD).

5. The method of claim 1, further comprising:
   modulating a frequency of the output.

6. The method of claim 5, wherein the modulating comprises:
   linearly modulating the frequency of the output from a first value to a second value with time.

7. The method of claim 6, wherein the linearly modulating comprises:
   modulating the frequency of the output such that the frequency is linearly repeated from the first value to the second value.

8. The method of claim 7, wherein the outputting comprises:
   generating the laser comb for each modulation time point at which the frequency of the output is modulated.

9. The method of claim 8, wherein the generating comprises:
   selecting the first comb line and the second comb line from the laser comb for each modulation time point such that a difference in frequency between the first comb line and the second comb line linearly increases based on a frequency modulated at each modulation time point; and
   generating the terahertz wave of which a frequency increases at each modulation time point based on the difference in frequency between the first comb line and the second comb line.

10. The method of claim 9, wherein the selecting comprises:
    selecting the first comb line and the second comb line from the laser comb in response to a synchronization signal output for each modulation time point.

11. A terahertz wave generation apparatus comprising:
    a laser comb generator configured to generate a laser comb by modulating a laser output from a laser source based on a linearly modulated frequency of an output that is output from a frequency source;
    a frequency selector configured to select a first comb line and a second comb line from the laser comb;
    a terahertz wave generator configured to generate a terahertz wave based on the first comb line and the second comb line; and
    a frequency modulator configured to modulate a frequency of the output such that the frequency is linearly repeated from a first value to a second value with time.

12. The terahertz wave generation apparatus of claim 11, wherein the frequency modulator is configured to generate a synchronization signal and output the generated synchronization signal such that the frequency selector operates at each modulation time point at which the frequency of the output is modulated.

13. The terahertz wave generation apparatus of claim 12, wherein the laser comb generator is configured to generate the laser comb at each modulation time point.

14. The terahertz wave generation apparatus of claim 13, wherein the frequency selector is configured to select the first comb line and the second comb line from the laser comb for each modulation time point such that a difference in frequency between the first comb line and the second comb line linearly increases based on a frequency modulated at each modulation time point.

15. The terahertz wave generation apparatus of claim 14, wherein the frequency selector is configured to select the first comb line and the second comb line from the laser comb in response to a synchronization signal output at each modulation time point.

16. The terahertz wave generation apparatus of claim 14, wherein the terahertz wave generator is configured to generate the terahertz wave of which a frequency increases at each modulation time point.

17. A terahertz wave generation system comprising:
    a laser source;
    a frequency source; and
    a terahertz wave generation apparatus,
    wherein the terahertz wave generation apparatus modulates a frequency of an output that is output from the frequency source such that the frequency is linearly repeated from a first value to a second value, generates a laser comb by modulating a laser output from the laser source at each modulation time point at which the frequency of the output is modulated based on the modulated frequency, selects a first comb line and a second comb line from the laser comb, and generates a terahertz wave based on the first comb line and the second comb line.

* * * * *